A. Whitcomb,
Planing Metals.
No. 93,847.  Patented Aug. 17, 1869.

Witnesses,  Inventor,
L. Hailer  A. Whitcomb
Phil. T. Dodge  by Dodge & Munn
 his attys.

United States Patent Office.

ALONZO WHITCOMB, OF WORCESTER, MASSACHUSETTS.

Letters Patent No. 93,847, dated August 17, 1869.

IMPROVEMENT IN MACHINES FOR PLANING METAL.

The Schedule referred to in these Letters Patent and making part of the same.

*To all whom it may concern:*

Be it known that I, ALONZO WHITCOMB, of Worcester, in the county of Worcester, and State of Massachusetts, have invented certain new and useful Improvements in Planers for Metal-Working; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to machines known as planers for working metals; and

It consists in a novel construction of a friction-clutch for the feed of the same, as hereinafter more fully explained.

Figures 1, 2:
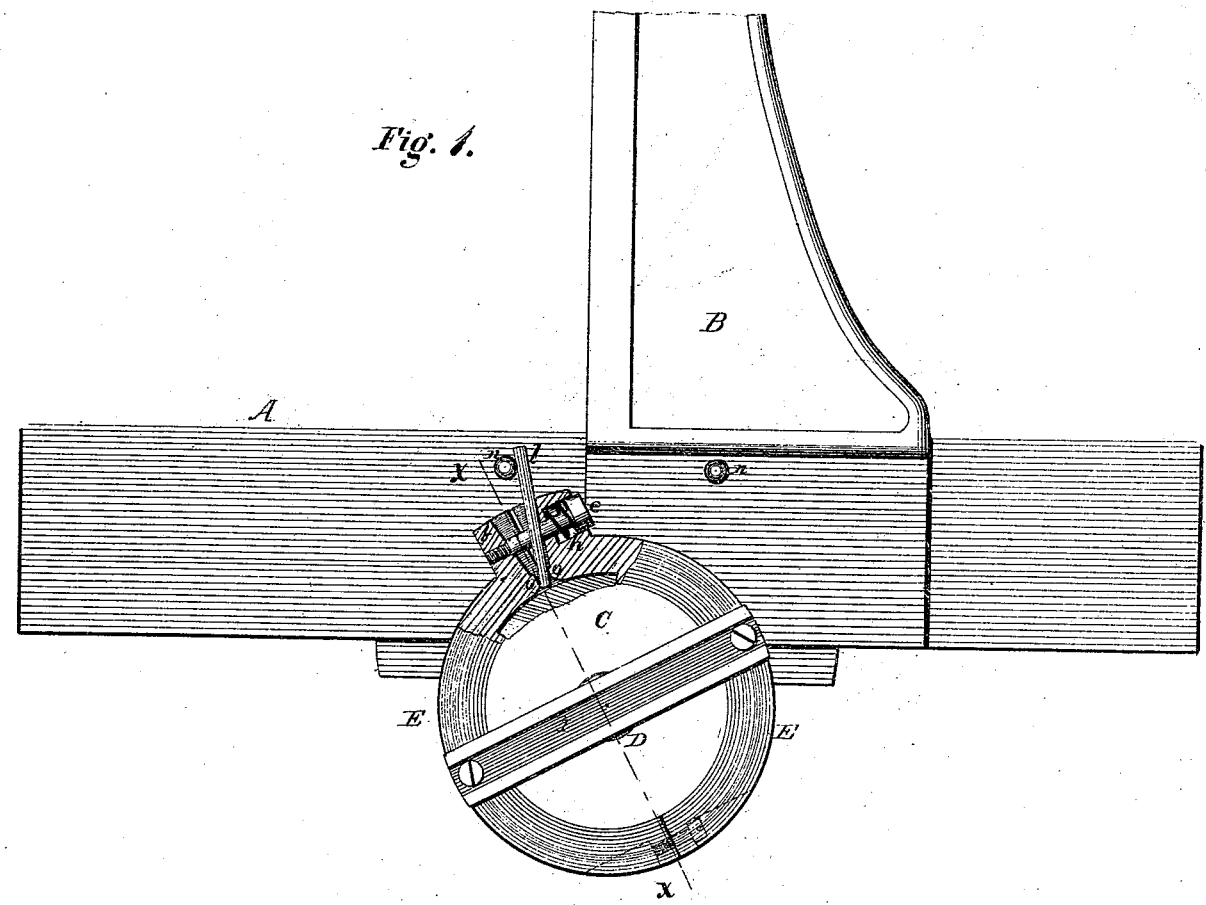
Figure 1 is a side elevation, with a portion broken away.
Figure 2 is a sectional view of a portion of the same, taken on the line x x of fig. 1.

A represents the horizontal, and B, the upright part of the frame of a planer, these parts being constructed in the usual manner.

Transversely under the bed A, usually extends a shaft, D, upon one end of which is secured a circular head or disk, C.

Around this disk, I secure a friction-clutch, consisting of two semicircular pieces, E, grooved on their inner face to fit the periphery of the disk C, as shown in fig. 2.

These pieces may be hinged together at their lower joint, or they may be secured together by a screw, as represented in dotted lines in fig. 1.

At their opposite ends, these pieces, E, are provided with radial projections, b, which have their adjoining faces cut out, so that when the two are placed together, there shall be a V-shaped recess or cavity between them, as represented in fig. 1.

On each side of this recess, near its inner extremity, there is left a projection, o, as shown in fig. 1.

Within the cavity thus formed, I secure a lever, l, which is held therein by a screw-bolt, e, which passes through the projections or arms b on the pieces E; said bolt e having its head fitting loosely in a cavity in one of said arms, with a spiral spring underneath it, and passing through an elongated or enlarged opening in the lever l, which latter is thereby held in place, but is left loose to move to and fro in the cavity.

When the parts are thus constructed and applied, it will be seen that the spring h tends to draw the two sections E of the ring together, thereby causing them to hug the disk C with more or less force, according to the tension of the spring, and that consequently, when the shaft D, with the disk C, revolves in either direction, the clutch moves with it, carrying the cross-bar I, which is attached to the clutch, along also; but that, whenever the lever l comes in contact with either of the pins n, which project from the side of the frame A, the lever l, operating on the projections o, as fulcra, serves to overcome the force of spring h, and pushes the sections E asunder, and thereby releases them of their hold on the disk C, permitting the latter to continue its movement, while the clutch or ring, with its bar I, remains stationary.

By this arrangement, the clutch or ring will move, with the head C, through the space between the pins n only; and in either direction, while the head itself may make any number of revolutions.

All the other parts of the planer may be constructed in any of the usual methods, and therefore need not be herein described, as they constitute no part of my present invention.

Having thus described my invention,

What I claim, is—

The friction-clutch, consisting of the parts E E and the lever l, with the spring h, constructed and arranged to operate substantially as described.

ALONZO WHITCOMB.

Witnesses:
ALFRED R. BRONSON,
J. HENRY HILL.